United States Patent [19]
Pera et al.

[11] 3,771,989
[45] Nov. 13, 1973

[54] METHOD OF CONTROLLING THE GROWTH OF ALGAE

[75] Inventors: John D. Pera; Betty S. Johnson, both of Memphis, Tenn.

[73] Assignee: Buckman Laboratories, Inc., Memphis, Tenn.

[22] Filed: Nov. 26, 1971

[21] Appl. No.: 202,581

[52] U.S. Cl. ............... 71/67, 260/567.6 P, 424/329
[51] Int. Cl. ............................................. A01n 9/20
[58] Field of Search ................................. 71/67, 121

[56] References Cited
UNITED STATES PATENTS
3,299,138   1/1967   Sueum et al. ........................... 71/67

OTHER PUBLICATIONS

Eldred S. African Patent application No. 6,908,949, July 1970, Chem. Abst. Vol. 74 (1971) 64844p Primary Examiner—Lewis Gotts
Assistant Examiner—Catherine L. Mills
Attorney—Floyd Trimble

[57] ABSTRACT

Poly[oxyethylene(dimethyliminio)ethylene(dimethyliminio)ethylene dichloride] prepared by the reaction of N,N,N',N'-tetramethylethylenediamine with dichloroethyl ether in an aqueous medium is useful as an algicide.

5 Claims, No Drawings

METHOD OF CONTROLLING THE GROWTH OF ALGAE

This invention relates to the use of the product poly[oxyethylene(dimethyliminio)ethylene(dimethyliminio)ethylene dichloride] in controlling the growth of algae. More particularly, the foregoing product is useful as an algicide in industrial and other systems employing water as a major component wherein said algicide must be substantially nonfoaming and nonirritating to warmblooded animals. As used herein, the term "warmblooded animals" is employed in a broad sense to include man, lower animals, and fowls.

The growth of algae in systems as defined above has a deleterious effect upon the efficient operation of such systems if means are not taken to inhibit the growth of said algae.

It has been suggested in the chemical literature that certain quaternary ammonium compounds could be used as algicides. These compounds while effective as algicides are not entirely satisfactory. Quaternary ammonium compounds are cationic surfactants and when added to water even in minute quantities, produce a system tending to foam, an objectionable result in most applications. Another objection to the use of these quaternary compounds is that they are generally very irritating to the skin of warmblooded animals.

It is, therefore, a principal object of the present invention to provide a process for the control of algae which process obviates the disadvantages of the prior art processes of this type.

This and other objects, features, and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the ways in which the principles of the invention may be employed.

In brief, the foregoing objects and advantages are attained by employing as an algicide a highly water-soluble cationic polymeric polyelectrolyte prepared by reacting dichloroethyl ether with N,N,N',N'-tetramethylethylenediamine in an aqueous medium. Generally the polymers prepared by this reaction have molecular weights varying from about 1,000 to about 10,000. They may be further characterized by formula and name as approved by the editors of Chemical Abstracts as follows:

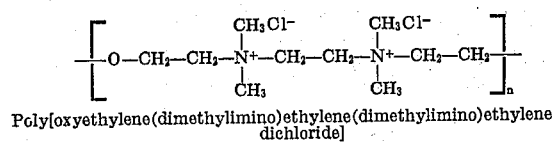

Poly[oxyethylene(dimethylimino)ethylene(dimethylimino)ethylene dichloride]

wherein $n$ is an integer varying from 4 to 40.

When these polymers are used as algicides according to the teachings of our invention, suitable quantities vary from 0.1 to 100 parts per million parts of water. Preferred quantities vary from 0.2 to 20 parts per million parts of water. It will be understood, of course, that larger quantities of the polymer may be used with no detrimental effect, but such larger quantities increase the cost of operation with limited material benefit.

Since the polymeric polyelectrolytes as disclosed herein are not only very effective algicides but, in addition thereto, are substantially nonfoaming and nonirritating, they are particularly useful in such diverse applications as the control of algae in cooling towers, holding ponds, swimming pools, and similar applications where an algicide having such properties is mandatory or at least desirable.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of poly[oxyethylene(dimethyliminio)ethylene(dimethyliminio)ethylene dichloride]

A 300-gallon stainless steel reactor fitted with a stirrer was charged with 317 pounds of N,N,N',N'-tetramethylethylenediamine, 392 pounds of dichloroethyl ether, and 381 pounds of water. The contents were stirred and hot water was introduced into the jacket. The temperature was maintained at 93°–102° C. for a period of 16 hours. At the end of this period, the resulting aqueous polymer solution was cooled and removed from the reactor. The polymer had a reduced viscosity of 0.3, wherein reduced viscosity is defined as the specific viscosity divided by the concentration in grams per 100 milliliters. In this example, a concentration of 0.2 gram of polymer per 100 milliliters of water was used to determine the reduced viscosity.

Additional poly[oxyethylene(dimethyliminio)ethylene(dimethyliminio)ethylene dichloride] polymers were prepared having molecular weights varying from 1,000 to 10,000 by varying the experimental conditions used in Example 1.

EXAMPLE 2

The effectiveness of the polymer of Example 1 against the four algae *Chlorella pyrenoidosa*, *Chlorococcum hypnosporum*, *Oscillatoria prolifera*, and *Volvox carteri* was determined in various media. *Chlorella pyrenoidosa* and *Chlorococcum hypnosporum* were tested in modified Bristol's solution prepared as follows:

| Compound | Grams per 400 ml. |
|---|---|
| Sodium nitrate | 10.0 |
| Calcium chloride | 1.0 |
| Magnesium sulfate | 3.0 |
| Potassium phosphate, dibasic | 3.0 |
| Potassium phosphate, monobasic | 7.0 |
| Sodium chloride | 1.0 |

To 940 milliters of deionized water were added 10 milliliters of each of the above stock solutions and 1.0 milliliter of each of the four stock, trade-element solutions prepared as follows:

| Compound | Grams per liter |
|---|---|
| Boric acid | 11.42 |
| Ferrous sulfate | 4.98 |
| Zinc sulfate | 8.82 |
| Manganese chloride | 1.44 |
| Molybdic acid | 0.71 |
| Cupric sulfate | 1.57 |
| Cobaltous nitrate | 0.49 |
| Ethylenediamine tetracetic acid | 50.0 |
| Potassium hydroxide | 31.0 |

*Oscillatoria prolifera* and *Volvox carteri* were treated in Chu No. 10 media (with nitrogen source doubled) prepared as follows:

| Compound | Grams per liter |
|---|---|
| Calcium nitrate | 0.080 |
| Potassium phosphate, dibasic | 0.010 |
| Magnesium sulfate | 0.025 |
| Sodium carbonate | 0.020 |
| Sodium silicate | 0.025 |
| Ferric citrate | 0.003 |
| Citric acid | 0.003 |

Forty-gram portions of the algae medium were added to 250-milliliter Pyrex Erlenmeyer flasks fitted with loose metal caps and then sterilized. Each of the following substances was then added to the flasks in the order listed:

1. Sterile algae medium as required in each individual case to bring the total weight of the contents of each flask to 50 grams, after allowing for all subsequent additions specified hereinafter.
2. Solution of toxicant or control agent to be evaluated in each test, to give the concentration desired in parts per million by weight.
3. *Chlorella pyrenoidosa*, *Chlorococcum hypnosporum*, *Oscillatoria prolifera*, and *Volvox carteri* are the algae used for these tests. The size of inoculum in the case of *Chlorella pyrenoidosa* and *Volvox carteri* was such as to give an initial inoculation level of 300,000 cells per milliliter. The inoculum in the case of *Chlorococcum hypnosporum* and *Oscillatoria prolifera* was an amount sufficient to give excellent growth in the controls after 14 days. This was achieved by adding 1 milliliter of a 14-day-old culture having luxuriant growth. The *Chlorella pyrenoidosa* culture was obtained from American Type Culture Collection No. 7516; *Chlorococcum hypnosporum*, Starr No. 119; *Oscillatoria prolifera*, Starr No. 1270; and *Volvox carteri*, Starr-Carolina female were all obtained from the Culture Collection of Algae at Indiana University.

After the inoculum of the test algae had been added, the flasks were allowed to incubate at temperature 28°±2° C. under fluorescent illumination of 250 foot-candle intensity (8 hours, 16 hours darkness) for a period adequate for growth in the controls (those portions of medium which contained no toxicant). Observations of growth were made at 7-day intervals on the basis of the following key:

4 = Excellent
3 = Good
2 = Poor
1 = Very poor, scant, questionable
0 = No growth The results are summarized in Table 1.

TABLE 1
Inhibition of green and blue-green algae by the product of Example 1 after 28 days

| Concentration, parts per million | Growth | | | |
|---|---|---|---|---|
| | Volvox carteri | Oscillatoria prolifera | Chlorococcum hypnosporum | Chlorella pyrenoidosa |
| 0 | 4 | 4 | 4 | 4 |
| 0.5 | 1 | 3 | 1 | 4 |
| 1.0 | 0 | 3 | 0 | 4 |
| 2.0 | 0 | 4 | 0 | 4 |
| 4.0 | 0 | 0 | 0 | 0 |
| 8.0 | 0 | 0 | 0 | 0 |
| 10.0 | 0 | 0 | 0 | 0 |
| 15.0 | 0 | 0 | 0 | 0 |

Similar results were obtained when the polymers having molecular weights varying from 1,000 to 10,000 were substituted for the polymer of Example 1. We have also found that these polymers plus the polymer of Example 1 are effective in controlling the growth and proliferation of other microorganisms including bacteria.

EXAMPLE 3

In this example the effectiveness of the polymer of Example 1 in controlling the growth of algae in a cooling tower was determined. The cooling tower used in this test was located on the roof of an eight-story office building in Miami, Fla., and had a consistent history of severe fouling as a result of algae growth. Even following mechanical and chemical cleaning, significant algae growth was usually observed within 3 days.

The tower is identified as a double-cross-flow tower with induced draft. The top deck, slats, and sumpwalls are constructed of wood and the outside walls and louvers are made of asbestos cement. The tower is operated 365 days per year in conjunction with a 310-ton air-conditioning system. Capacity of the circulating water system is 1,800 gallons with a circulation rate of approximately 1,000 gallons per minute. Normal daily bleed-off is approximately 1,800 gallons per day. Loss from evaporation and drift was such as to require a daily makeup of 8,600 gallons per day. A typical analysis of the makeup water indicated a total hardness of 75 and a pH of 8.1.

Just prior to treatment with the product of Example 1, an approximate 0.5-inch algal mat was removed from the top deck by scrubbing. The polymer was initially added to the system in the form of a slug dose to provide a concentration of 20 parts per million based on total weight of water in the system. Four days later the tower was inspected and found to be free of algae growth on the top deck. Since the bleed-off rate of this tower is approximately 1,800 gallons per day, the concentration of any slug addition of the polymer is reduced by 50 percent within 17 hours. Thus, the system was again treated with a 20-parts-per-million slug dose of the polymer. The system was not treated for a period of 6 days and at the end of this period the deck remained free of any algae growth.

In a second test a cooling tower located in Los Angeles, Calif., cools process water for an industrial firm. At the time of the test run there was a mat of algae-bacterial slime approximately 0.25 inch thick covering the cooling tower slats and on deck surfaces. The tower is a double-cross-flow tower with draft having:

Total capacity — 280,000 gallons
Bleed-off — 16,000 gallons
Makeup — 39,000 gallons
Total hardness — 20 grains per gallon (340 p.p.m.)
pH — 7.5

Treatment with the polymer of Example 1 was initiated with a slug dose equivalent to 15 parts per million. Subsequent treatment in an amount equal to 7.5 parts per million of the polymer was made 5 days later and every 5th day thereafter. This treatment killed and dispersed the algae-bacterial slime and kept the slats and top deck free of microbial growth. The treatment has been underway for 2 months. Based upon a theoretical loss of 14 percent of the polymer daily, the treatment described above maintains a level of between 10 parts per million and 17.5 parts per million in the circulating water.

EXAMPLE 4

In this series of tests the effectiveness of the products of this invention in inhibiting the growth of algae in swimming pools was determined.

A swimming pool in Tennessee was infested with an extensive algae "bloom" to the extent that the turbidity limited visibility in the pool to less than 1 foot. A single slug does of 10 parts per million of the product of Example 1 was applied. After 3 days, the pool water was crystal clear and all the dead algae was deposited on the bottom of the pool where it was easily removed by conventional vacuuming. No chlorination or other chemical treatment has been necessary for over a month and the pool water has remained in excellent condition.

A second pool in Tennessee was found to have a heavy bacterial infection despite heavy bromination of the water with a continuous "brominator." A single 10 parts per million dose of the product of Example 1 resulted in complete clarification of the pool water in 3 days, eliminating the hazy appearance of the water. Microscopic examination of a water sample demonstrated the essential elimination of the biological life in the system.

A swimming pool in California was heavily infested with black algae. The growth was particularly severe at the seams in the pool. A slug dose sufficient to provide 10 parts per million of the product of Example 1 was added to the pool and the algae disappeared in a few days. During this period, no chlorine was used. Subsequent treatment at 5 parts per million added at intervals of 1 to 3 weeks have maintained this pool free of algae for 9 months.

The owner of a second pool in California was experiencing difficulty in operating the pool filter because algae growth tended to plug his filter and cause high back pressures. Chlorine was being used in this pool to prevent bacterial growth. The product of Example 1 was added at the rate of 15 parts per million initially and then at the rate of 5 parts per million at 1 to 3 week intervals. Normal filtering operations resulted and the pool has remained free of algae for 9 months.

A clean swimming pool in Florida was treated at weekly intervals with 4 parts per million of the product of Example 1 and no algae was observed at the end of a month.

Similar results were obtained when polymers having molecular weights varying from 1,000 to 10,000 were substituted for the polymer of Example 1.

EXAMPLE 5

In this test the inhalation toxicity of the polymer of Example 1 was determined by exposing five male and five female albino rats confined in a chamber to an air stream containing the polymer. Experimentally the flow rate of air through the chamber was equal to 5 liters per minute and each liter of air contained about 26.4 milligrams of polymer. All rats were exposed to the air flow for 1 hour plus a 31 minute equilibration period. At the end of this test all of the rats exhibited mildly adverse effects, but at the end of 14 days all rats appeared normal.

EXAMPLE 6

This test was conducted to determine whether or not the polymer of Example 1 would cause irritation of the eyes. In this test 0.1 milliliter of the polymer of Example 1 was instilled into the conjunctival sac of albino rabbits. The eyes so treated showed no ill effects whatever 48 to 72 hours following instillation of the polymer.

EXAMPLE 7

In this example a patch test was conducted to determine if the polymer of Example 1 was an irritant to human skin. Experimentally two drops of a 60-percent aqueous solution of the polymer was applied to a small area on the forearm of 27 male and 18 female adults. The area so treated was covered for a period of 24 hours with a 1-inch Band-Aid. None of the adults involved in the test showed any indication of skin irritation immediately after the removal of the Band-Aid or anytime thereafter.

EXAMPLE 8

In this test 10 male white guinea pigs weighing 300 to 400 grams were each injected intracutaneously with 0.1 milligram of a 0.1 percent saline solution of the polymer of Example 1 every other day until 10 injections had been made. Two weeks after the 10th injection, each guinea pig was injected with 0.02 milligram of a freshly prepared solution, also containing 0.1 percent of the polymer. None of the test animals showed any evidence of skin sensitivity.

The foregoing examples, particularly Examples 6, 7, and 8, demonstrate that the polymer of Example 1 which is a quaternary ammonium compound is not irritating. This is in marked contrast to most quaternary ammonium compounds. For example, in Surfactant Science Series, vol. 4, Cationic Surfactants, edited by Eric Jungermann and published by Marcel Dekker, Inc., New York (1970), pp. 540–541, it is stated:

> A study in which standard methodology was used to compare the dermal irritancy, at relatively high concentrations, of six compounds representing three different chemical groups was reported by Duprey and Hoppe in 1967. The comparison included three of the dialkyls, dialkylbenzylmethylammonium chloride, dialkyldimethylammonium chloride, and didecyldimethylammonium chloride; two alkyldimethylbenzylammonium chlorides, Cyncal and Roccal MC–14; and one from the alkyldimethyl substituted benzyl group, BTC 2125. These were all studied by applying 0.5 milligram, or in the case of Roccal MC–14 0.5 grams of powder, to intact and abraded skin of the rabbits' backs and scoring according to standard Draize procedure. The results were given in the following tabulation:

| Compound | Primary irritation index | Adjective rating |
|---|---|---|
| Dialkylbenzylmethylammonium chloride (53.3 percent) | 8 | Severe |
| Dialkyldimethylammonium chloride (50.6 percent) | 8 | Severe |
| Didecyldimethylammonium chloride (55.7 percent) | 8 | Severe |
| Cyncal (50 percent) | 6.92 | Severe |
| Roccal MC–14 (92.6 percent powder) | 3.0 | Moderate |
| BTC 2125 (50 percent) | 7.5 | Severe |

According to the Draize criteria, scores of 2 or less indicate only mild irritation, 2–5 indicate moderate irritation, and scores above 6 are considered severe irritants.

> In brief, all five of the liquid agents investigated by these authors produced severe effects upon the skin as contrasted to the compounds employed by the present inventors which are not irritating.

EXAMPLE 9

The acute dermal toxicity of the polymers of our invention was evaluated by single 24-hour dermal applications to abraded and intact rabbit skin at dosage levels of 31.6, 100, 316, 1,000, and 2,000 milligrams per kilogram of body weight in this test. None of the polymers was found to be irritating except when used in large amounts, 1,000 to 2,000 milligrams per kilogram of body weight. Even at these higher concentrations the polymers were found to be only mildly irritating.

EXAMPLE 10

In this experiment the amount of foam produced by a solution containing the polymer of Example 1 and that by solution containing two other quaternary ammonium compounds used as algicides were measured. Experimentally three separate solutions were prepared as follows: Solution No. 1 contained the polymer of Example 1; Solution No. 2 contained the algicide identified by the mark Barquat MB–50 which is an alkyl dimethylbenzyl ammonium chloride characterized in that the alkyl group represents a mixture consisting of 40 percent $C_{12}$, 50 percent $C_{14}$, and 10 percent $C_{16}$ alkyls; and Solution No. 3 contained the algicide identified by the mark Algistat which is a composition consisting of 84 percent n-alkyl dimethylbenzyl ammonium chloride and 16 percent n-dialkyl methylbenzyl ammonium chloride characterized in that the alkyl groups of each of the two benzyl ammonium chlorides represent a mixture consisting of 5 percent $C_{12}$, 60 percent $C_{14}$, 30 percent $C_{16}$, and 5 percent $C_{18}$ alkyls. The concentration of the algicide in each of the three solutions was equal to 50 parts per million parts of water. One-hundred milliliters of each solution was agitated for a period of 1 minute on a shaker after which the foam height was measured. The experiments together with the results are summarized in Table 2:

TABLE 2.—Comparative foam-producing characteristics of three algicides.

| Solution | Foam height Millimeters |
|---|---|
| 1 | 0.5 |
| 2 | 20 |
| 3 | 16 |

While particular embodiments of the invention have been described, it will be understood, of course, that the invention is not limited thereto since many modifications may be made and it is, therefore, contemplated to cover by the appended claims any such modifications as fall within the true spirit and scope of the invention.

The invention having thus been described, what is claimed and desired to be secured by Letters Patent is:

1. The method of inhibiting the growth of algae in an aqueous system which comprises contacting said algae with a polymer having the formula and name:

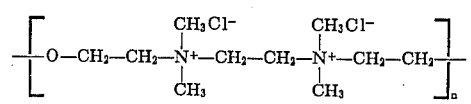

Poly[oxyethylene(dimethylimino)ethylene(dimethylimino)ethylene dichloride]

wherein $n$ is an integer varying from 4 to 40 in an amount sufficient to inhibit the growth of said algae.

2. The method of claim 1 wherein the polymer has a molecular weight varying from 1,000 to 10,000.

3. The method of inhibiting the growth of algae in cooling towers which comprises adding to the water in said cooling tower the polymer defined in claim 1 in an amount sufficient to inhibit the growth of said algae.

4. The method of inhibiting the growth of algae in holding ponds which comprises adding to the water in said holding ponds the polymer defined in claim 1 in an amount sufficient to inhibit the growth of said algae.

5. The method of inhibiting the growth of algae in swimming pools which comprises adding to the water in said swimming pools the polymer defined in claim 1 in an amount sufficient to inhibit the growth of said algae.

* * * * *